United States Patent [19]
Zumbe et al.

[11] Patent Number: 5,989,619
[45] Date of Patent: Nov. 23, 1999

[54] PROCESS FOR MANUFACTURE OF REDUCED FAT CHOCOLATE

[75] Inventors: Albert Zumbe, Coventry; Nigel Sanders, West Midlands, both of United Kingdom

[73] Assignee: Cadbury Schweppes PLC, London, United Kingdom

[21] Appl. No.: 08/849,467

[22] PCT Filed: Dec. 5, 1995

[86] PCT No.: PCT/GB95/02831

§ 371 Date: Sep. 16, 1997

§ 102(e) Date: Sep. 16, 1997

[87] PCT Pub. No.: WO96/17523

PCT Pub. Date: Jun. 13, 1996

[30] Foreign Application Priority Data

Dec. 9, 1994 [GB] United Kingdom .................... 9424855

[51] Int. Cl.⁶ .................................................. A23G 1/00
[52] U.S. Cl. ............................................ 426/631; 426/660
[58] Field of Search ..................................... 426/660, 631

[56] References Cited

U.S. PATENT DOCUMENTS

| | | |
|---|---|---|
| 2,760,867 | 8/1956 | Kempf et al. . |
| 5,776,534 | 7/1998 | Tremblay ................ 426/660 |
| 5,882,709 | 3/1999 | Zambe .................... 426/631 |

FOREIGN PATENT DOCUMENTS

| | | |
|---|---|---|
| 0317917 | 5/1989 | European Pat. Off. . |
| 37 35 087 | 6/1988 | Germany . |
| 42 00 517 | 7/1993 | Germany . |
| 61-028346 | 2/1986 | Japan . |
| 399891 | 4/1966 | Switzerland . |
| WO9219112 | 11/1992 | WIPO . |
| WO9406303 | 3/1994 | WIPO . |
| WO9409649 | 5/1994 | WIPO . |
| WO9518541 | 7/1995 | WIPO . |

*Primary Examiner*—Carolyn Paden
*Attorney, Agent, or Firm*—Jacobson, Price, Holman & Stern, PLLC

[57] ABSTRACT

A chocolate composition having a reduced fat content of typically 18 to 25 wt % is produced by mixing (i) a major portion of a higher fat chocolate composition which has been flavour-developed, preferably by conching, with (ii) a minor proportion of a lower fat chocolate having a fat content below that required in the final chocolate composition, so as to produce the final reduced fat chocolate composition.

12 Claims, No Drawings

PROCESS FOR MANUFACTURE OF REDUCED FAT CHOCOLATE

TECHNICAL FIELD OF THE INVENTION

This invention relates to a process for the manufacture of reduced fat chocolate.

Chocolate is a food with high fat and high energy contents. Milk chocolate, for example, has a fat content varying widely in the range of 27 to 40 wt %, but more typically contains about 31 wt % of fat and has an assimilable total energy content of about 530 kcal/100 g of which the fat content contributes more than 50%. Internationally accepted nutritional guidelines propose that fat should provide no more than 30% to 35% energy.

In theory, reduction in the fat content of chocolate can be simply achieved by reducing the amount of fat ingredients (such as cocoa butter or milk fat) or of fat-containing ingredients (such as cocoa liquor, milk powder or hazelnut) to be mixed with other chocolate-making ingredients to form the chocolate composition. There are, however, technical restraints on fat reduction in chocolate compositions. Chocolate compositions need to be processed in liquid form. Because the continuous liquid phase of such chocolate compositions is the fat phase, the lower the fat content, the more the viscosity increases, thus making it increasingly difficult to process. One of the important processing steps for making chocolate is a flavour-developing step which is traditionally referred to as "conching". This is a time consuming step and alternative flavour-developing steps can be used which involve intimate mixing or kneading of the liquid chocolate ingredients. As the fat content is reduced, the conching or other flavour-developing step becomes increasingly difficult, resulting in less flavour development. Additionally, the reduction in fat available to coat the ingredients, notably sugar, leads to chocolate of inferior mouthfeel.

DESCRIPTION OF THE PRIOR ART

One way of overcoming this problem in the manufacture of chocolate compositions having a reduced fat-derived energy content is to substitute the cocoa butter and/or other metabolisable fat content of the chocolate by partially or wholly non-metabolisable fats. This technique is disclosed, for example, in EP-A-0285187, EP-A-0285187 and EP-A-0495553 and enables the fat content to be maintained at a level sufficient to permit processing. However, the use of certain of these non-metabolisable fats in chocolate can lead to anal leakage which is likely to limit acceptability by consumers. The effective calorific content of partially or wholly non-metabolisable fats within the body is uncertain.

Other ways of reducing the fat-derived energy content of chocolate involve initial formulation of chocolate having a low fat content wherein the particle size of the solid particles, particularly the sugar particles, is controlled so as to avoid as far as possible the presence of ultrafine particles, since it is these ultrafine particles which increase the viscosity and require increasing amounts of fat to coat the particles. Thus, in the case of milk chocolate, it is known that at least about 50% of the surface area of the particles in milk chocolate is produced by the presence of particles below 2 $\mu$m in size. Various proposals have been made for screening out such ultrafine particles. U.S. Pat. No. 5,080,923 discloses a process which involves first reducing granulated nutritive carbohydrate sweetener for use in the composition to a particle size required for the finished product specification by various methods including milling and roll refining. Either before or after size reduction, the nutritive carbohydrate sweetener is blended with fat, i.e. cocoa butter. At this point, water is blended into the mixture so as to dissolve the ultrafines (particles below 10 $\mu$m) and the angular and jagged edges of the larger particles. The mixture is then dried. In WO 94/09649, emulsifier is included with the water when dissolving the ultrafine particles. However, we have found that it is difficult to dry the mixture following such water treatment.

DESCRIPTION OF THE INVENTION

It is an object of the present invention to provide an improved method of manufacturing a low-fat content chocolate composition.

In accordance with the present invention, a chocolate composition is produced which has a higher fat content than desired in the final chocolate composition and is then mixed with at least one chocolate making ingredient having a fat content which is appropriately below the desired fat content of the final chocolate composition so as to result in a final chocolate composition having the desired fat content.

With the process according to the present invention, the chocolate composition having the higher-than-desired fat content (hereinafter referred to simply as "the higher fat chocolate") can be more readily processed through the various stages including the flavour-developing stage. The amount of the higher fat chocolate may be chosen such that it represents the major proportion (ie more than 50 wt % of the final chocolate composition so that it only needs to be blended with a small amount of said at least one chocolate-making ingredient having a fat content which is appropriately below the desired fat content of the final chocolate composition (hereinafter referred to simply as "the lower fat material"). Preferably, the higher fat chocolate constitutes 50 to 95, more preferably 65 to 90, wt % of the final chocolate composition.

In one procedure, the lower fat material is milled to the required particle size (typically, a median particle size of no more than 25 $\mu$m and preferably less than 10 $\mu$m) and then blended with the higher fat chocolate in a ratio such as to reduce the fat content to the desired value. The lower fat material will normally contain at least one of cocoa solids, milk solids and nutritive sweetener.

In an alternative procedure, the lower fat material may be blended in unmilled form with the higher fat chocolate in a ratio to reduce the fat content to the desired value, followed by milling of the resultant mixture, for example in a roll refiner, and then pasting.

Following mixing, the resultant low fat chocolate composition may be tempered, moulded, extruded or converted to flake.

The process of the present invention is mainly applicable to reducing the fat content from typically 31 wt % to a suitably low level, such as from 16.5 to less than 25 wt %, preferably 18 to 22 wt %. However, in many countries, chocolate composition as legally defined requires a minimum of 25 wt % fat. Thus, the term "chocolate composition" should be construed as covering not only chocolate compositions which can be sold as "chocolate" in countries where chocolate is legally defined, but also chocolate compositions which, because of the lower fat content, cannot legally be described as "chocolate" in such countries.

The present invention is applicable to the production of chocolate having a lower fat content which is at the lower end of the fat content range specified in the legal definition of "chocolate" since, depending upon the nature and/or physical form of the other ingredients, processing of chocolate having a fat content of 25 to 28 wt % can be problematic. Thus, the present invention is also applicable to the production of chocolate compositions which have a fat content of 25 wt % or greater.

It is also within the scope of the present invention to replace at least some of the cocoa butter with butterfat or vegetable fat including cocoa butter equivalent (CBE), either in the higher fat chocolate or in the lower fat material or in both. CBE's are fats with a composition similar to cocoa butter, chemically and physically, which are normally made from non-lauric fats and which are currently permitted in an amount up to 5 wt % in some countries. The present invention is further applicable to compositions in which some of the cocoa butter is replaced by a partly or wholly non-metabolisable fat, for example Caprenin, either in the higher fat chocolate or in the lower fat material or in both, but preferably in the higher fat material.

In order to improve the viscosity during processing of the chocolate composition, at least one emulsifier will normally be employed either in the higher fat chocolate or in the lower fat material or in both. Typically, such emulsifiers include lecithin derived from soya bean, safflower, corn, etc, fractionated lecithins enriched with either phosphatidyl choline, phosphatidyl ethanolamine, phosphatidyl inositol; emulsifiers derived from oats, mono- and diglycerides and their tartaric esters, monosodium phosphate derivatives of mono- and diglycerides of edible fats and oils, sorbitan monostearate, polyoxyethylene sorbitan monostearate, hydroxylated lecithin, synthetic phospholipids such as ammonium phosphatides, lactylated fatty acid esters of glycerol and propylene glycol, polyglycerol esters of fatty acids, propylene glycol mono- and diesters of fats and fatty acids. It is preferred to use at least one of soya lecithin, ammonium phosphatides and polyglycerol polyricinoleate as the emulsifier, and particularly in the lower fat material. Preferably, at least part of said at least one emulsifier is added separately to the mix of the higher fat chocolate and the lower fat material.

Chocolate compositions manufactured in accordance with the present invention may further include flavourings, especially those traditionally associated with chocolate, such as vanilla. Other edible substances that may be present in the chocolate composition include those allowed under Council Directive 73/241/EEC of Jul. 24, 1973 relating to cocoa and chocolate products intended for human consumption. Such flavourings and/or other edible substances may be included in the higher fat chocolate and/or as part of the lower fat material.

In the process of the present invention, there is no particular requirement for strict limits on the amount of ultrafine particles. In general, the particle size requirement for making chocolate compositions according to the process of the present invention is equivalent to that for making normal full-fat chocolate. Thus, in general the median particle size of the solid particles of the higher fat chocolate and of the milled lower fat material will be no more than 25 μm and preferably less than 10 μm.

The same applies to compositions where milling takes place after the higher fat chocolate and umilled lower fat material have been blended together.

The higher fat chocolate which is used in the process of the present invention may be a full fat milk, plain or white chocolate (or any combination thereof) having a fat content generally in the range of from 25 to 40 wt %, preferably 27 to 40 wt %. In one aspect, the higher fat chocolate which is used in the process of the present invention meets the relevant legal regulations applying to chocolate. Thus, the higher fat chocolate which is used in the process of the present invention may be identical to that which is sold as chocolate. However, the higher fat chocolate used in the process of the present invention does not necessarily need to meet the relevant and legal regulations on chocolate, and any of the cocoa solids, milk solids, nutritive carbohydrate sweeteners or any combination thereof may be absent or present in amounts lesser or greater than the legal requirement. The higher fat chocolate used in the process of the present invention can be made by any convenient processing technology, especially those processing steps (eg conching) which optimise textural and flavour characteristics.

As mentioned above, the lower fat material used in the process of the present invention may be milled before blending it with the higher fat chocolate or after blending has taken place. Typically, said lower fat material contains or comprises cocoa powder (preferably low fat or fat free) and/or cocoa liquor; sucrose and/or dextrose and/or other permitted carbohydrates, but preferably sucrose; whole milk powder and/or any processed or part-processed milk powder such as skimmed milk powder, whey powder, milk protein concentrate, lactose, modified milk powder, yoghurt powder, but is preferably skimmed milk powder and/or whole milk powder and/or whey powder and/or lactose. The formulation of said lower fat material which is used in the process of the present invention depends upon the formulation of the higher fat chocolate with which it is to be blended and the desired fat content of the final chocolate composition. However, the fat content of the lower fat material is typically up to about 15 wt % and more preferably is up to about 10 wt %.

For sugar-reduced or sugar-free chocolate, the sugar may be partially or wholly replaced either in the higher fat chocolate or in said lower fat material or in both by one or more other nutritive sweeteners such as dextrose, glucose syrup solids, fructose, lactose or maltose. These nutritive sweeteners may be partly or wholly replaced by one or more sugar substitutes such as sugar alcohols (eg lactitol, maltitol, isomalt, xylitol, mannitol, sorbitol, ethrythritol, preferably lactitol, maltitol, isomalt or any combination thereof, particularly when in the lower fat material); bulking agents (eg polydextrose, inulin, polyfructose, microcrystalline cellulose, preferably polydextrose, particularly when in the lower fat material); and intense sweeteners (eg aspartame, acesulfame-K, cyclamates, saccharin, sucralose, neohesperidin, dihydrochalone, alitame, stevia sweeteners, glycyrrhizin, thaumatin, preferably aspartame and/or acesulfame-K, particularly when in the lower fat material).

The lower fat material for the milled mix (eg skimmed milk powder and/or low (11%) fat cocoa powder and/or sucrose) may be mixed in a food grade blender and then milled to meet the desired particle size criterion in a hammer, pin or vane mill, preferably with classifier, or using a roll refiner. In the case where the lower fat material is formed of two or more ingredients, these may be milled individually or pre-mixed and then milled.

The preparation of milled lower fat material for blending with plain chocolate or white chocolate is as described in the previous paragraph except that all sources of milk solids are excluded in the case of plain chocolate production, and all sources of non-fat cocoa solids are excluded in the case of white chocolate production.

When cocoa liquor is used as a source of cocoa solids in the lower fat ingredient(s), it is usually milled using a ball mill or roll refiner, either alone or with milk powder depending on the type of chocolate required, to meet the desired particle size distribution specification. It can then be mixed with sucrose or sucrose replacement which has been premilled to meet the desired particle size distribution. In variations of this process, part of the sucrose and/or milk powder can be added to the cocoa liquor before ball milling or roll refining.

In one aspect, ingredients of the milled lower fat material are converted to chocolate crumb using, for example, standard techniques well known in the art. In the case where the lower fat material contains the appropriate ingredients, this may involve heating so as to promote the Maillard reaction or it may involve simply a granulation procedure to produce the physical structure of a granule or crumb. The crumb is then pre-milled, pasted and milled to meet the desired particle size specification. Dependent on fat content, cryogenic milling may be required.

The manufacture of the required low fat chocolate composition from the higher fat chocolate composition and the milled lower fat ingredient mix may then proceed as follows:

Liquid higher fat chocolate composition is put into mixer/paster and the milled mix added, followed by blending/conching until fluid, and emulsifiers are then mixed into the mass together with any remaining minor ingredients. The chocolate can then be tempered and moulded, extruded, converted to flake or used as a coating chocolate composition.

It has been found surprisingly that the order of addition of ingredients is not critical and, for example, full fat chocolate can be added to the milled mix. Moreover, it is possible to make the low fat chocolate composition from tempered or untempered higher fat chocolate composition. Milled low fat chocolate as the lower fat material may be blended with tempered higher fat chocolate with or without addition of emulsifier, and the resultant chocolate directly extruded, moulded or converted to flake.

In the manufacture of low fat chocolate composition wherein the lower fat ingredients are not milled before blending, such lower fat ingredients may be in the form of chocolate crumb. The unmilled lower fat ingredients may be blended with the higher fat chocolate composition and the resultant blend milled to the desired particle size distribution using, for example, a roll refiner. The refined mix may then be put into a mixer/paster with emulsifier and minor ingredients where necessary and conched until fluid. The chocolate can then be extruded, moulded or converted to flake.

Where the lower fat material is made up of more than one ingredient, there is no need to add all of these at the same time to the higher fat chocolate, for example minor ingredients, particularly those which do not need to be milled or otherwise commuted, may be added after any such step.

As a further alternative, the lower fat material may be produced by pressing higher fat chocolate or by subjecting it to solvent extraction to reduce the fat content to below the desired final low fat content, and then milling the resultant press cake to meet the desired particle size specification before blending with the higher fat chocolate composition and emulsifier and/or other minor ingredients where necessary.

The detailed description of the invention so far relates not only to the manufacture of chocolate compositions with fat contents in the range 16.5 to less than 25 wt % fat, but also to more modest reductions in fat content. These may range from a reduction of less than 1%, to reducing the fat content of higher fat chocolate to 25%. Such fat reductions may be desirable for technological, nutritional or commercial reasons.

Despite published teaching that manufacture of good quality low fat chocolate requires the particle size distribution of sucrose or nutritive carbohydrate sweetener to be carefully controlled particularly in relation to ultrafine particles, it has been surprisingly discovered that no greater restriction on the particle size of the nutritive sweetener or of lower fat material is required than for conventional full fat chocolate.

The resultant final chocolate composition most preferably has a moisture content of not more than about 1 wt % and may be plain chocolate, milk chocolate or white chocolate and may take the form of vermicelli chocolate, chocolate flakes and gianduja nut chocolate derived from any of such chocolate types. Alternatively, the resultant final chocolate composition may be filled, may be of single mouthful size, may be used in pralines or noisettes or it may be used as a coating chocolate. Prevailing chocolate regulations on the content of dry non-fat cocoa solids, total dry milk solids and sucrose may be adopted in many embodiments of low fat chocolate composition produced according to the present invention.

As is commonly the case with conventional chocolate, confectionery shapes (eg blocks) may be formed by mixing the chocolate composition produced according to the present invention with one or more of such food items as biscuit pieces, crispies, nuts (whole or pieces), ginger pieces, cherries, raisins or other dried fruits, and forming the resultant mixture to produce the required shape in which these items are embedded in the solidified chocolate composition.

DETAILED DESCRIPTION OF THE INVENTION

The invention will now be described in further detail in the following Examples.

EXAMPLE 1

Granulated sugar (50 kg), skimmed milk powder (22.6 kg) and low fat (11 wt %) cocoa powder (6.1 kg) were mixed and milled at ambient temperature in a Mikro ACM classifier mill, mill speed 7200 rpm, classifier speed 1500 rpm, to give a low fat powder (about 1.5 wt % fat) having a mean particle size of 14 $\mu$m.

7.5 kg of a full fat (30 wt %), conventionally processed, finished molten milk chocolate composition (containing sugar, cocoa butter, cocoa solids, milk solids and emulsifier) was put into the 10 qt bowl of a Hobart mixer jacketed at 40° C. and stirred at speed 1. 3.45 kg of the above-milled low fat powder was added and mixing continued for 30 minutes. Ammonium phosphatides (15 g) and polyglycerol polyricinoleate (40 g) were added and mixed for 10 minutes. The resulting chocolate having a fat content of 21.7 wt % was tempered on a marble slab and moulded in the traditional manner into tablets. The resultant chocolate had the characteristic taste and flavour of full fat chocolate.

EXAMPLE 2

Example 1 was repeated except that the milled low fat powder was put into the bowl of the Hobart mixer first and stirred at speed 1 before the full fat milk chocolate composition was added. The resultant chocolate had the characteristic taste and flavour of full fat chocolate.

EXAMPLE 3

Granulated sugar (50 kg), skimmed milk powder (22.6 kg) and low fat (11 wt %) cocoa powder (6.1 kg) were processed into a chocolate crumb by addition of 13 kg water followed by drying to about 1 wt % moisture under vacuum. This crumb was milled in a Mikro ACM classifier mill, mill speed 7000 rpm, classifier speed 1000 rpm giving a mean particle size of 19 μm.

7.5 kg of the same full fat (30 wt %) chocolate as used in Example 1 was put into the 10 qt bowl of Hobart mixer at 40° C. and stirred at speed 1. Milled crumb (3.45 kg) was added and mixing continued for 30 minutes. Ammonium phosphatides (15 g) and polyglycerol polyricinoleate (40 g) were added and mixed for a further 10 minutes. The resulting chocolate having a fat content of 22.0 wt % was tempered and moulded in the traditional manner The resultant chocolate had the characteristic taste and flavour of full fat chocolate.

EXAMPLE 4

Granulated sugar, skimmed milk powder and low fat (11 wt %) cocoa powder were pre-milled individually at ambient temperature in a Mikro ACM classifier mill, mill speed 7200 rpm, classifier speed 3000 rpm, giving a mean particle size of 8–10 μm, then mixed together in the respective weight ratio of 50:22.6:6.1.

To 7.5 kg of the same full fat (30 wt %) chocolate as used in Example 1 in the 10 qt bowl of a Hobart mixer jacketed at 29° C., ammonium phosphatides (15 g), polyglycerol polyricinoleate (40 g) and 3.45 kg of the milled mix were added and mixed for 30 minutes. The resulting chocolate having a fat content of 21.5 wt % was tempered using a scraped-surface heat exchanger and then extruded to tubular shape and cut into bars. The resultant chocolate had the characteristic taste and flavour of full fat chocolate.

EXAMPLE 5

5.32 kg of the same liquid full fat (30 wt %) chocolate as used in Example 1 was pressed at 70° C. at 400 bar in a conventional cocoa press until 1.2 kg fat was removed. The residual press cake was milled in a Hosakawa HA 40/32 hammer mill fitted with a 3 mm screen at 200 rpm. 5 kg of the same liquid full fat chocolate as used in Example 1 was put into the 10 qt bowl of a Hobart mixer jacketed at 40° C. and stirred at speed 1. 3.5 kg of the milled press cake was added with ammonium phosphatides (20 g) and mixing continued for 30 minutes. The mix was then refined using a Buhler 3 roll refiner to a mean particle size of 8 μm. The refined mix was conched in a Hobart mixer for 2 hours at 40° C., tempered on a marble slab and moulded into tablets. The resultant chocolate had the characteristic taste and flavour of full fat chocolate.

EXAMPLE 6

Caster sugar (1.01 kg), skimmed milk powder (457 g) and low fat (11 wt %) cocoa powder (123 g) were premixed and added to 4 kg of the same full fat (30 wt %) chocolate as used in Example 1 and ammonium phosphatides (10 g) in the 10 qt bowl of a Hobart mixer jacketed at 40° C., and stirred at speed 1 for 30 minutes. The mix was then refined using a Buhler 3 roll refiner to a mean particle size of 8 μm. The refined mix was conched in a Hobart mixer for 2 hours at 40° C., tempered on a marble slab and moulded into tablets. The resultant chocolate had the characteristic taste and flavour of full fat chocolate.

We claim:

1. A method of producing a chocolate composition having a fat content of from 16.5 to 28 wt %, comprising the steps of:

(a) forming a chocolate composition which has a higher fat content than desired in the chocolate composition to be produced, (b) subject said higher fat chocolate composition to a flavour development procedure selected from the group consisting of conching, intimate mixing and kneading, (c) milling to a required particle size at least one chocolate-making ingredient having a fat content of up to about 15 wt %, and (d) blending said at least one chocolate-making ingredient after milling with the higher fat chocolate composition in a ratio such that the higher fat chocolate composition constitutes a major proportion of the final chocolate composition and the fat content is reduced so that the final chocolate composition has a fat content of from 16.5 to 28 wt %.

2. A method as claimed in claim 1, wherein the flavour development procedure comprises conching the higher fat chocolate composition.

3. A method as claimed in claim 1, wherein said at least one chocolate-making ingredient comprises at least one of cocoa solids, milk solids, nutritive sweeteners and non-nutritive sweeteners.

4. A method as claimed in claim 1, wherein following said mixing step the resultant low fat chocolate composition is subjected to a further processing comprising one or more steps selected from tempering, moulding, extruding and converting to flake.

5. A method as claimed in claim 1, wherein the final chocolate composition has a fat content of from 16.5 to less than 25 wt %.

6. A method as claimed in claim 1, wherein the final chocolate composition has a fat content of from 18 to 22 wt %.

7. A method as claimed in claims 1, wherein the final chocolate composition has a fat content of from 25 to 28 wt %.

8. A method as claimed in claim 1, wherein the median particle size of the solid particles of the higher fat chocolate composition and of said at least one chocolate-making ingredient is no more than 25 μm.

9. A method as claimed in claim 1, wherein the higher fat chocolate composition is at least one chocolate composition selected from a full fat milk composition having a fat content in the range of from 25 to 40 wt %, a plain chocolate composition having a fat content in the range of from 25 to 40 wt %, and a white chocolate composition having a fat content in the range of from 25 to 40 wt %.

10. A method as claimed in claim 1, wherein said at least one least one chocolate-making ingredient is milled and formed into crumbs or granules.

11. A method as claimed in claim 1, wherein said at least one chocolate-making ingredient includes milk solids and sugar which are heated to develop flavour.

12. A method as claimed in claim 1, further comprising the step of adding at least one emulsifier to the mixture of the higher fat chocolate composition and said at least one chocolate-making ingredient after said mixing step.

* * * * *